April 3, 1973 K. D. VESELY ET AL 3,725,249
CONTINUOUS REFORMING-REGENERATION PROCESS
Filed Dec. 14, 1971
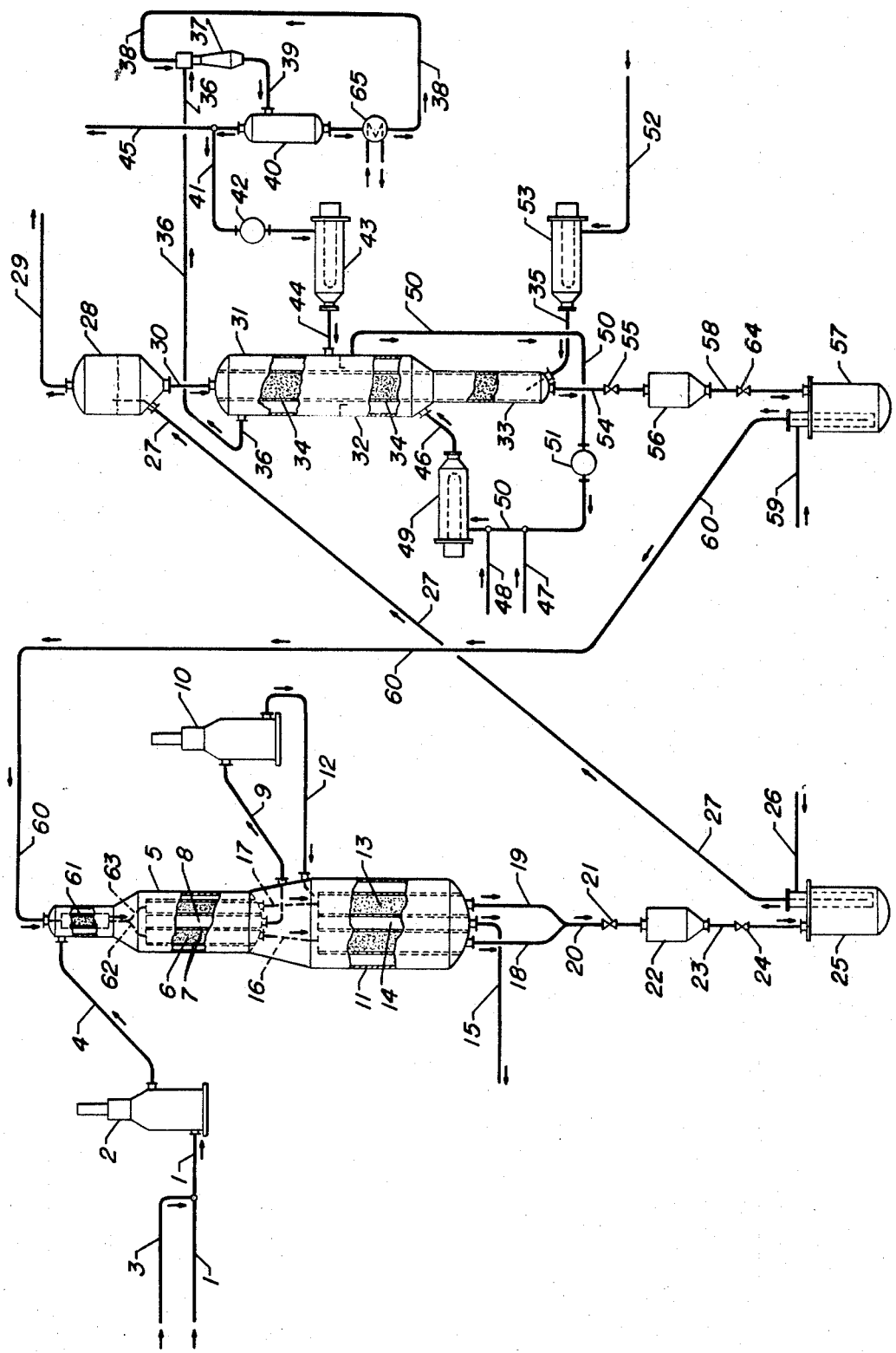

United States Patent Office 3,725,249
Patented Apr. 3, 1973

3,725,249
CONTINUOUS REFORMING-REGENERATION PROCESS
Kenneth Donald Vesely, Arlington Heights, and Arthur Raymond Greenwood, Niles, Ill., assignors to Universal Oil Products Company, Des Plaines, Ill.
Continuation-in-part of application Ser. No. 860,905, Sept. 25, 1969. This application Dec. 14, 1971, Ser. No. 207,869
Int. Cl. C10g 35/06
U.S. Cl. 208—139                                21 Claims

ABSTRACT OF THE DISCLOSURE

A method of operating a continuous reforming-regeneration process employing a halogen-containing platinum catalyst preferably comprising one or more promoter metals wherein catalyst activity is maintained at a predetermined level by continuous regeneration thereof without the removal of any reactor from the process stream. The method includes the continuous reduction and sulfiding of the catalyst prior to contact with the reactant stream, the reduction and sulfiding being effected in a confined zone in indirect heat exchange relationship with the preheated reactant stream charged to the reforming process.

---

This application is a continuation-in-part application of a copending application Ser. No. 860,905, now U.S. Pat. No. 3,647,680, filed Sept. 25, 1969.

The reforming of hydrocarbon feed stocks, such as a naphtha fraction derived from petroleum, utilizing a platinum group metal-alumina catalyst, is a process well known in the art. Briefly, a naphtha feed stock is admixed with hydrogen and contacted with the catalyst, usually in a fixed bed reaction zone, at reforming conditions of temperature and pressure to cause at least a portion of the naphtha feed stock to be upgraded to products of improved octane value. Prior art reforming processes generally comprise one of two types of operation, i.e., a non-regenerative type and a regenerative type. In the practice of a non-regenerative type of operation, the catalyst is maintained in continuous use over an extended period of time, say from about five months to about a year or more depending on the quality of the catalyst and the nature of the feed stock. Following this extended period of operation, the reforming reactor is taken off stream while the catalyst is regenerated or replaced with fresh catalyst. In the practice of the regenerative type of operation, the catalyst is regenerated with greater frequency utilizing a multiple fixed bed reactor system arranged for series flow of the feed stock in such a manner that at least one reactor can be taken off stream while the catalyst is regenerated in situ or replaced with fresh catalyst, one or more companion reactors remaining on stream, or going on stream, to replace the off stream reactor. Subsequently, the regenerated fixed bed reactor is placed on stream while another is taken off stream and the catalyst bed is regenerated or replaced with fresh catalyst in like manner.

It is apparent from the brief description of prior art non-regenerative and regenerative reforming processes that both means of operation embody certain undesirable features. For example, in the non-regenerative type of operation, the entire plant is usually taken off stream to effect regeneration or replacement of the catalyst with a resultant significant loss in production. Further, the non-regenerative type of operation is characterized by a continuing decline in catalyst activity during the processing period requiring an operation of increasing severity to maintain product quality, usually at the expense of product quantity. In the regenerative type of operation utilizing a multiple fixed bed reactor system, or "swing reactor" system, similar problems are encountered although to a lesser degree. However, the start up and shut down procedures relating to insertion and removal of a reactor in the process stream are unduly complicated and require a complex system of valves, lines and other equipment to accomplish reactor change over with a minimum loss of process time.

It is therefore desirable to provide a reforming process which would substantially obviate the undesirable features of prior art non-regenerative and regenerative type reforming processes. More specifically, it would be desirable to have a reforming process whereby a predetermined high level of catalyst activity and stability is maintained without resorting to the removal of the reforming reactor from the process stream and a consequent loss of process time.

Accordingly, it is an object of this invention to present an improved catalytic reforming process whereby a predetermined high level of catalyst activity and stability is maintained over extended periods of time. Thus, in accordance with one embodiment of this invention, there is provided a method of operating a continuous reforming-regeneration process employing a halogen-containing platinum group metal catalyst which comprises preheating a hydrogen-hydrocarbon reaction mixture to reforming temperature, charging the reaction mixture to a reactor and treating the reactant stream therein at reforming conditions in contact with dense phase moving bed of catalyst particles; withdrawing used catalyst particles from the said reactor while maintaining the same on stream at reforming conditions; treating the used catalyst particles with an oxygen-containing gas to burn at least a portion of the carbonaceous matter therefrom, and with steam admixed with a halogenating agent selected from the group consisting of halogen and hydrogen halide to re-establish the halogen level thereof; passing the halogenated particles through a drying zone and drying said particles therein in contact with a stream of hot dry air; charging the dried catalyst particles together with hydrogen to the top of said reactor and processing the catalyst particles downwardly as a dense phase moving bed in contact with said hydrogen through a confined reducing zone in the upper portion of said reactor to effect an indirect heat exchange relationship with the hot reaction mixture charge thereto whereby said particles are reduced at a temperature from about 800° to about 1100° F.; processing the reduced catalyst particles downwardly as a dense phase moving bed in contact with said hydrogen to a confined sulfiding zone in open communication with said reducing zone, continuously introducing and commingling a sulfiding agent with the hot catalyst particles and hydrogen in said sulfiding zone, the resulting reduced and sulfided particles being processed downwardly from said sulfiding zone together with hydrogen and added to the dense phase moving bed of said reactor in contact with the reactant stream therein to maintain a substantially constant catalyst inventory in said reactor.

Other objects and embodiments of this invention will become apparent in the following detailed specification.

The catalyst employed in the practice of this invention suitably comprises a platinum group metal, combined halogen and alumina. Preferably, the catalyst will contain platinum and one or more promoter metals such as rhenium, germanium, tin, lead, etc., and combined chlorine composited with a spherical alumina such as prepared by the oil drop method described in U.S. Pat. No. 2,620,314 issued to James Hoekstra. Other platinum group metals including palladium, rhodium, ruthenium, osmium and iridium are suitable although less commonly employed.

Also, other refractory inorganic oxides including silica, zirconia, boria, thoria, etc., as well as composites thereof such as silica-alumina, alumina-boria, and the like, may be used with satisfactory results. Generally, the platinum group metal will comprise from about 0.01 to about 5.0 wt. percent of the catalyst composite, from about 0.10 to about 0.80 wt. percent being preferred. While the halogen component may be chlorine, bromine, fluorine and/or iodine, chlorine is most usually utilized to impart the desired acid-acting character to the catalyst. The halogen component, suitably comprising from about 0.20 to about 1.5 wt. percent of the catalyst composite, is measured as elemental halogen although present in a combined form with one or more of the other catalyst components. Those skilled in the art are familiar with the preparation of the reforming catalyst herein contemplated and, since the novelty of the present invention does not reside in the catalyst per se, a further detailed description is not warranted.

Catalytic reforming conditions include a temperature of from about 700° to about 1100° F., a pressure of from about 50 to about 1000 p.s.i.g., a liquid hourly space velocity of from about 0.2 to about 10, and a hydrogen to hydrocarbon mole ratio of from about 1:1 to about 10:1. The method of this invention is particularly adapted to low pressure reforming, preferably at a pressure of from about 50 to about 200 p.s.i.g. Since the reforming reaction is endothermic in nature, in the event a multiple reactor system is employed, the effluent from a given reactor is generally reheated to reaction temperature prior to introduction into the next succeeding reactor.

As used herein, the term "activity" relates to the capacity of the catalyst system to convert the low octane naphtha feed stock to a relatively high octane product, for example a gasoline fraction with an octane rating in excess of about 90, at a given temperature, pressure and space velocity. The concept of the present invention permits reforming of the hydrocarbon feed stock in contact with a catalyst system characterized by a substantially constant activity level. This is accomplished in part by the method of this invention which provides for the constant replacement of used catalyst in the system with regenerated catalyst whereby the catalyst system remains at a substantially constant activity level at a given temperature, pressure and space velocity. This is in contrast to conventional non-regenerative and regenerative operations where catalyst activity is maintained at a constant level by increasing the severity of the operation.

In the schematic drawing, the reactant stream is depicted as being processed through a multiple reactor system comprising two vertically stacked reactors with intermediate heating of the reactant stream between reactors. However, it is understood that the reactant stream may be processed through a multiple reactor system comprising reactors arranged side-by-side in the common fashion and with intermediate heating of the reactant stream between reactors to maintain desired reforming temperatures in the various reactors. It is further understood that a single reactor system may be employed, or any combination of the described systems. In the multiple reactor system, fresh or reconditioned catalyst may be continuously added to an initial or top reactor and processed serially or sequentially through the reactor system, the catalyst being withdrawn from the final or bottom reactor, as the case may be, for reconditioning in accordance with the method of this invention. Alternatively, fresh or regenerated catalyst may be continuously added to each of two or more reactors, the catalyst being withdrawn from each of said reactors in incremental amounts for regeneration according to the method of this invention. In the latter case, the used catalyst from the various reactors is commingled in a common hopper, regenerated according to the method of this invention, and subsequently distributed to said reactors as required to maintain a substantially constant catalyst inventory therein. Alternatively, the catalyst of a selected reactor may be periodically regenerated while maintaining all reactors of the system, including the selected reactor, on stream at reforming conditions.

In the preferred multiple reactor system comprising stacked reactors, the reactor system will in effect have a common catalyst bed moving as a substantially unbroken column of particles from the top reactor to the bottom reactor. Thus, used catalyst is withdrawn from the bottom reactor while regenerated catalyst is added to the top reactor, and the catalyst of the reactor system is regenerated with all reactors remaining on stream at reforming conditions.

Referring then to the drawing, and at the same time setting forth an illustrative operation, a straight-run gasoline fraction boiling in the 200–400° F. range is charged to the process through line 1 at a liquid hourly space velocity of about 2.0, entering a heater 2 in admixture with a hydrogen-rich gas stream recycled through line 3 from a product separator not shown. In a conventional reforming operation, a considerable excess of hydrogen is admixed with the hydrocarbon charge to minimize carbon formation on the catalyst. Typically, hydrogen is employed in about a 10:1 mole ratio with the hydrocarbon charge. However, the method of this invention, wherein the catalyst is subjected to relatively frequent regeneration, requires substantially less hydrogen, a hydrogen-hydrocarbon mole ratio of from about 1:1 to about 5:1 being suitably and preferably employed. Thus, in the present illustration, the heated combined stream comprises hydrogen and hydrocarbon in a mole ratio of about 3:1, said heated combined stream being withdrawn from the heater 2 by way of line 4 and charged into the upper portion of reforming reactor 5.

Reforming reactor 5 is shown in vertical alignment with reforming reactor 11, with an intermediate heater 10. The reforming catalyst charged to reactor 5, as hereinafter described, is comprised of spherical 1/16" diameter particles containing about 0.2 wt. percent rhenium, 0.375 wt. percent platinum and 0.9 wt. percent combined chlorine, the remainder being alumina. The reactor temperatures are maintained in the 850–1000° F. range and the pressure at about 150 p.s.i.g. Reforming reactor 5 is shown with catalyst confined in an annular moving bed 6 formed by spaced cylindrical screens 7. The reactant stream is passed in an out-to-in radial flow through the catalyst bed, the reactant stream continuing downwardly through the cylindrical space 8 formed by said annular bed 6 and exiting to heater 10 by way of line 9. Since the reaction is endothermic, the effluent from the reactor 5 is reheated in heater 10 and thereafter charged to reactor 11 through line 12. Again, the reactant stream is passed in an out-to-in radial flow through the annular catalyst bed 13 substantially as described with respect to reactor 5, the flow passing downwardly through the cylindrical space 14 and passing from reactor 11 by way of line 15. The reactor effluent withdrawn through line 15 is passed to conventional product separation facilities for recovery of high octane product, for example a reformate having a clear octane number rating of about 100, and recovery and recycle of a hydrogen-rich gas stream to the reactor system.

The catalyst particles descending through reactor 5 as an annular moving bed 6, are continued to the annular moving bed 13 of reactor 11 by way of catalyst transfer conduits 16 and 17. Conduits 16 and 17 represent a mutitude of catalyst transfer conduits permitting passage of the catalyst between said annular beds 6 and 13 and effecting a suitable pressure drop whereby substantially all of the reactant stream from reactor 5 is directed through the heater 10 by way of line 9 with only a minimal amount by-passing said heater 10 and passing directly to reactor 11 together with the catalyst flow through conduits 16 and 17. Thus, in effect, the reactor system has a common catalyst bed moving as a substantially unbroken column of particles through the top reactor 5 and the bottom reactor 11. In the present example, the used catalyst is withdrawn through lines 18 and 19 at a rate such that the catalyst inventory of the reactor system is replaced in about 15 day cycles. The catalyst is withdrawn intermittently through line 20 and by means of control valve 21 to effect a moving bed type of operation, the catalyst being discharged into a lock-hopper 22 for separation of residual hydrocarbon therefrom. The used catalyst is subsequently transferred through line 23 and control valve 24 to a lift engager 25 to be lifted in a nitrogen stream to a disengaging hopper 28 by way of line 27. The catalyst is lifted to said hopper 28 by a flow of nitrogen charged to the lift engager 25 through line 26 from an external source not shown. Nitrogen is charged to the lift engager 25 at the rate of about 531 standard cubic feet per hour and at a temperature of about 100° F.

The used catalyst deposited in the disengaging hopper 28 comprises about 0.7 wt. percent combined chloride and 2–5 wt. percent carbon. An overhead line 29 is provided to vent the disengaging hopper 28 to the atmosphere or to recycle the nitrogen. Catalyst particles from the disengaging hopper 28 are fed through line 30 to a catalyst regenerator comprising a carbon burn-off zone 31, a chlorination zone 32, and a drying zone 33. The catalyst particles are processed downwardly as a moving bed or column in a confined regeneration zone 34, passing from the carbon burn-off zone 31 to the chlorination zone 32. Chlorinated and substantially carbon-free particles are then continued downwardly through the drying zone 33 and contacted therein with a hot, dry air flow to effect the separation of excess adsorbed gaseous components from the catalyst.

In the present example, the catalyst particles are passed from the disengaging hopper 28 to the catalyst regenerator at an average rate of about 200 pounds per hour. The catalyst particles are processed downwardly through the carbon burn-off zone 31 at a rate to establish an average residence time therein of about 2 hours.

In the carbon burn-off zone 31, the catalyst particles are heated in contact with an oxygen-containing gas including hot recycle gases charged to the carbon burn-off zone 31 at a gaseous hourly space velocity of about 4700 by way of line 44. The oxygen-containing gas is derived from air charged to the drying zone 33 by way of line 35, the air becoming admixed with steam, chlorine, and HCl on passing upwardly through the chlorination zone 32, and the gaseous mixture continuing upwardly through the carbon burn-off zone 31 in contact with the catalyst particles contained therein. The resulting gaseous products, including oxides of carbon and sulfur, are withdrawn from the carbon burn-off zone 31 as flue gases through line 36. In some cases, it may be desirable to separate sulfur components from the flue gases prior to recycle. In that event, the flue gases are charged to a scrubber 37 wherein they are admixed with a caustic stream recycled from a caustic settling tank 40 through a cooler 65 and line 38. The mixture is then passed to the caustic settling tank via line 39. The resulting flue gases, substantially free of halogen and oxides of sulfur, are recovered overhead from the settling tank 40 through line 41 and charged by means of a blower 42 through a heater 43 and line 44 to the carbon burn-off zone 31 as aforesaid. The heater 43 is provided for start-up operation. The gases recycled to the carbon burn-off zone 31 comprise about 0.7 wt. percent oxygen to effect a controlled burning at a temperature of from about 830° to about 930° F. in the burn-off zone. An overhead vent line 45 is provided to discharge excess flue gas from the process.

The catalyst particles, substantially free of carbon, are processed through a halogenation zone in contact with steam admixed with a halogen and/or hydrogen halide. It is understood that said halogen and/or hydrogen halide may be formed in situ in said halogenation zone, for example by charging steam admixed with t-butylchloride, trichloroethylene, or other compound hydrolyzable to a halogen and/or hydrogen halide at treating conditions, to said halogenation zone. At least a portion of the platinum group metal component tends to agglomerate into a relatively inactive form during the limited exposure to reforming conditions and subsequent carbon burn-off treatment. The presence of steam in a mole ratio of at least about 0.5:1 with the halogen and/or hydrogen halide, and not necessarily in excess of about 80:1, is essential to re-establish the halogen level of the catalyst and to effectively redistribute the platinum group metal component on the catalyst in an active form substantially equivalent to the initial or original catalyst.

In the present illustrative example, the catalyst particles substantially free of carbon are processed downwardly from the carbon burn-off zone 31 through the chlorination zone 32 at conditions to effect an average residence time therein of about 1 hour. In the chlorination zone 32, the catalyst particles are brought in contact with about a 2:1 mole ratio of steam and hydrogen chloride charged thereto through line 46, the steam and hydrogen chloride being admixed with air passing upwardly from the drying zone 33 as previously mentioned. Steam is charged to the system at a temperature of about 450° F. and at a rate of about 2.4 pounds per hour through line 47. The steam is passed through line 50 together with recycle vapors contained therein and admixed with hydrogen chloride from line 48, the hydrogen chloride being charged at a rate of about 1.45 pounds per hour. The steam-hydrogen chloride mixture is suitably heated to a temperature of from about 750° to about 1100° F., and in the present example to about 930° F., in heater 49 and charged to the chlorination zone 32 through line 46 at a gaseous hourly space velocity of about 4700. A recycle stream comprising excess steam and hydrogen chloride is withdrawn from the chlorination zone 32 by way of line 50 and circulated by means of a blower 51 as a portion of the steam-hydrogen chloride charged to the chlorination zone 32.

From the chlorination zone 32, the catalyst particles are continued downwardly through the drying zone 33 whereby vaporous components are stripped from the catalyst by a flow of dry air. The air is charged to the system through line 52 from an external source not shown and heated to 750–1150° F. in heater 53 prior to being charged to the drying zone 33 through line 35. The air is charged at a gaseous hourly space velocity of about 150.

The catalyst particles are withdrawn from the regenerator at regular intervals by way of line 54 through control valve 55 and collected in lock-hopper 56. The catalyst is subsequently transferred to a lift engager 57 through line 58 and control valve 64 to be conveyed to the reforming reactor 5. The catalyst particles are carried through line 60 by a dry, pure hydrogen stream introduced to the lift engager 57 by way of line 59 at about 4000 standard cubic feet per hour and at ambient temperature. The hydrogen is subsequently used as a reducing gas and as a portion of the hydrogen feed to the reforming reactor 5.

Prior to direct contact with the reactant stream in reforming reactor 5, the catalyst in admixture with hydrogen is processed in a dense phase through a reducing zone 61 to effect an indirect heat exchange with hot reaction gases charged to said reactor whereby reduction of the catalyst is effected at a temperature of from about 800° to about 1100° F. More specifically, in the present example the catalyst is processed downwardly through the reducing zone 61 at a temperature of 950°–1000° F. at a rate to establish a residence time therein of about 2 hours.

Pursuant to the process of this invention, the reduced catalyst particles are processed downwardly as a moving bed in contact with said hydrogen to a confined sulfiding zone 62 in open communication with said reducing zone.

Thus, the catalyst particles are sulfided at a temperature substantially in accordance with the temperature of the reducing zone, i.e., at a temperature of from about 800° to about 1100° F., and in the present example, at a temperature of 950–1000° F. The sulfiding agent, preferably hydrogen sulfide, is continuously added to the moving bed of catalyst particles from line 63 to provide at least about 0.01 wt. percent sulfur, suitably from about 0.02 to about 0.20 wt. percent, on the catalyst prior to contact with the reactant stream. The hot catalyst particles are processed downwardly through the sulfiding zone as a moving bed at a rate to establish a residence time therein of from about 10 minutes to about 1 hour to insure substantially complete sorption of the hydrogen sulfide on the catalyst particles and substantially obviate any carry-over of residual free hydrogen sulfide to the reforming reaction zone. While hydrogen sulfide is a preferred sulfiding agent, any reducible sulfur-containing compound that does not contain oxygen and which is converted to hydrogen sulfide by reaction with hydrogen at conditions existing in the sulfiding zone may be employed. This class includes aliphatic mercaptans such as ethyl mercaptan, propyl mercaptan, t-butyl mercaptan, etc., alicyclic mercaptans such as cyclohexyl mercaptan, aromatic mercaptans such as thiophenol, aliphatic sulfides such as ethyl sulfide, aromatic sulfides such as phenyl sulfide, aliphatic disulfides such as t-butyl disulfide, aromatic disulfides as phenyl disulfide, thioacids, thioaldehydes, thioketones, and heterocyclic sulfur compounds such as the thiophenes and thiophanes, etc. In any case, the continuous sulfiding of the freshly activated moving catalyst bed prior to contact with the reactant stream in the initial reactor of the multiple reactor system inhibits undesirable side reactions, such as demethylation, otherwise catalyzed by the freshly activated catalyst during the initial stages of the reforming operation. The resulting reduced and sulfided catalyst is added to the catalyst bed through a plurality of catalyst transfer conduits represented by lines 66 and 67 replacing that withdrawn from the reactor system through lines 18 and 19 for regeneration.

The method of this invention finds particular application with respect to low pressure reforming. While low hydrogen partial pressures favor the main octane-improving reactions, e.g., dehydrogenation of paraffins and naphthenes, a principal objection to low pressure reforming is in the excessive formation of carbon resulting from condensation and polymerization reactions also favored by low hydrogen partial pressures. However, the continuous reforming-regeneration process of this invention substantially obviates this objection, and the relative catalyst instability resulting from carbon formation is no longer a limiting factor to a successful low pressure reforming operation. An added advantage derived from the practice of this invention is in the increased and continued supply of hydrogen available for hydrogen-consuming refinery operations, such as hydrocracking.

We claim as our invention:

1. A method of operating a continuous reforming-regeneration process employing a halogen-containing platinum group metal catalyst which comprises:
   (a) preheating a hydrogen-hydrocarbon reaction mixture to reforming temperature, charging the reaction mixture to a reactor, and treating the reactant stream therein in contact with a dense-phase moving bed of catalyst particles at reforming conditions;
   (b) withdrawing used catalyst particles from said reactor while maintaining the same on stream at reforming conditions;
   (c) treating the used catalyst particles with an oxygen-containing gas to burn at least a portion of the carbonaceous matter therefrom, and with steam admixed with a halogenating agent selected from the group consisting of halogen and hydrogen halide to re-establish the halogen level thereof;
   (d) passing the halogenated particles through a drying zone and drying said particles in contact with a stream of hot, dry air;
   (e) charging the catalyst particles together with hydrogen to the top of said reactor and processing the catalyst particles downwardly as a dense-phase moving bed in contact with said hydrogen through a confined reducing zone in the upper portion of said reactor to effect an indirect heat exchange relationship with the hot reaction mixture charged to said reactor whereby said particles are reduced at a temperature of from about 800° to about 1100° F.;
   (f) processing the reduced catalyst particles downwardly as a dense-phase moving bed in contact with said hydrogen to a confined sulfiding zone in open communication with said reducing zone, continuously introducing and commingling a sulfiding agent with the hot catalyst particles and hydrogen in said sulfiding zone, the resulting reduced and sulfided particles being processed downwardly from said sulfiding zone together with hydrogen and added to the dense-phase moving bed of said reactor in contact with the reactant stream therein to maintain a substantially constant catalyst inventory in said reactor.

2. The method of claim 1 further characterized in that said catalyst further comprises rhenium.

3. The method of claim 1 further characterized with respect to step (a) in that said reforming conditions include a temperature of from about 700° to about 1100° F., a pressure of from about 50 to about 200 p.s.i.g., a liquid hourly space velocity of from about 0.2 to about 10, and a hydrogen to hydrocarbon mole ratio of from about 1:1 to about 10:1.

4. The method of claim 1 further characterized with respect to step (c) in that said catalyst is treated with steam in admixture with said halogenating agent at a temperature of from about 750° to about 1100° F.

5. The method of claim 1 further characterized with respect to step (c) in that said steam is admixed with hydrogen chloride in a mole ratio of from about 0.5:1 to about 80:1.

6. The method of claim 1 further characterized with respect to step (f) in that said sulfiding agent is hydrogen sulfide.

7. The method of claim 1 further characterized with respect to step (f) in that said particles are processed through said sulfiding zone at a rate to establish a residence time therein of from about 10 minutes to about one hour to provide from about 0.01 to about 0.20 wt. percent sulfur on said catalyst prior to contact with the reactant stream.

8. A method of operating the continuous reforming-regeneration process employing a halogen-containing platinum group metal catalyst which comprises:
   (a) preheating a hydrogen-hydrocarbon reaction mixture to reforming temperature, charging the reaction mixture to the initial reactor of a multiple reactor system comprising moving bed reactors, and treating the reactant stream therein at reforming conditions in contact with a dense-phase moving bed of catalyst particles;
   (b) withdrawing catalyst particles from said initial reactor and continuing the particles through said multiple reactor system in series flow with used catalyst particles being recovered from the final reactor, all reactors remaining on stream at reforming conditions;
   (c) treating the used catalyst particles with an oxygen-containing gas to burn at least a portion of carbonaceous deposits therefrom, and with steam admixed with a halogenating agent selected from the group consisting of halogen and hydrogen halide to re-establish the halide level thereof;
   (d) passing the halogenated particles through a drying zone and drying said particles in contact with a stream of hot, dry air;

(e) charging the catalyst particles together with hydrogen to the top of said initial reactor, and processing the particles downwardly as a dense-phase moving bed in contact with said hydrogen through a confined reducing zone in the upper portion of said reactor to effect an indirect heat exchange relationship with the hot reaction mixture charged to said reactor whereby said particles are reduced at a temperature of from about 800° to about 1100° F.;

(f) processing the reduced catalyst particles downwardly as a dense-phase moving bed in contact with said hydrogen to a confined sulfiding zone in open communication with said reducing zone, continuously introducing and commingling a sulfiding agent with the hot catalyst particles and hydrogen in said sulfiding zone at a temperature of from about 800° to about 1100° F., the resulting reduced and sulfided catalyst particles being processed downwardly from said sulfiding zone together with residual hydrogen and added to the dense-phase moving catalyst bed of said initial reactor in contact with the reactant stream therein to maintain a substantially constant catalyst invenory in said multiple reactor system.

9. The method of claim 8 further characterized in the said catalyst further comprises rhenium.

10. The method of claim 8 further characterized with respect to step (a) in that said reforming conditions include a temperature of from about 700° to about 1100° F., a pressure of from about 50 to about 200 p.s.i.g., a liquid hourly space velocity of from about 0.2 to about 10, and a hydrogen to hydrocarbon mole ratio of from about 1:1 to about 10:1.

11. The method of claim 8 further characterized with respect to step (c) in that said catalyst is treated with steam in admixture with said halogenating agent at a temperature of from about 750° to about 1100° F.

12. The method of claim 8 further characterized with respect to step (c) in that said steam is admixed with hydrogen chloride in a mole ratio of from about 0.5:1 to about 80:1.

13. The method of claim 8 further characterized with respect to step (f) in that said sulfiding agent is hydrogen sulfide.

14. The method of claim 8 further characterized with respect to step (f) in that said particles are processed through said sulfiding zone at a rate to establish a residence time therein of from about 10 minutes to about 1 hour to provide from about 0.01 to about 0.20 wt. percent sulfur on the catalyst particles prior to contact with the reactant stream.

15. A method of operating a continuous reforming-regeneration process employing a halogen-containing platinum group metal catalyst which comprises:
(a) preheating a hydrogen-hydrocarbon reaction mixture to reforming temperature, charging the reaction mixture to the initial reactor of a multiple reactor system comprising stacked annular moving bed reactors openly connected through a plurality of catalyst transfer conduits, and passing the reactant stream in a substantially lateral flow through said annular catalyst bed at reforming conditions;
(b) withdrawing the catalyst particles from the moving bed of an upper reactor to the moving bed of a next lower reactor through said catalyst conduits whereby a pressure drop is created across said conduits and the reactant stream passing downwardly through the upper reactor is directed to the reactor outlet provided therefor;
(c) passing the reactant stream through a heating means to the next lower reactor, withdrawing used catalyst particles from the final reactor, all reactors remaining on stream at reforming conditions;

(d) treating the used catalyst particles with an oxygen-containing gas to burn at least a portion of the carbonaceous matter therefrom, and with steam admixed with a halogenating agent selected from the group consisting of halogen and hydrogen halide to reestablish the halogen level thereof;

(e) passing the halogenated particles through a drying zone in contact with a stream of hot, dry air; charging the catalyst particles together with hydrogen to the top of said initial reactor, and processing the particles downwardly as a dense-phase moving bed in contact with said hydrogen to a confined reducing zone in the upper portion of said reactor to effect an indirect heat exchange relationship with the hot reaction mixture charged to said reactor whereby said particles are reduced at a temperature of from about 800° to about 1100° F.;

(f) processing the reduced catalyst particles downwardly as a dense-phase moving bed in contact with said hydrogen to a confined sulfiding zone in open communication with said reducing zone, continuously introducing and commingling a sulfiding agent with the hot catalyst particles and hydrogen in said sulfiding zone at a temperature of from about 800° to about 1100° F., the resulting reduced and sulfided catalyst particles being processed downwardly from said sulfiding zone together with residual hydrogen and added to the dense-phase moving catalyst bed of said initial reactor in contact with the reactant stream therein to maintain a substantially constant catalyst inventory in said multiple reactor system.

16. The method of claim 15 further characterized in that said catalyst further comprises rhenium.

17. The method of claim 15 further characterized with respect to step (a) in that said reforming conditions include a temperature of from about 700° to about 1100° F., a pressure of from about 50 to about 200 p.s.i.g., a liquid hourly space velocity of from about 0.2 to about 10, and a hydrogen to hydrocarbon mole ratio of from about 1:1 to about 10:1.

18. The method of claim 15 further characterized with respect to step (c) in that said catalyst is treated with steam in admixture with said halogenating agent at a temperature of from about 750° to about 1100° F.

19. The method of claim 15 further characterized with respect to step (c) in that said steam is admixed with hydrogen chloride in a mole ratio of from about 0.5:1 to about 80:1.

20. The method of claim 15 further characterized with respect to step (f) in that said sulfiding agent is hydrogen sulfide.

21. The method of claim 15 further characterized with respect to step (f) in that said particles are processed through said sulfide zone at a rate to establish a residence time therein of from about 10 minutes to about 1 hour to provide from about 0.01 to about 0.20 wt. percent sulfur on the catalyst prior to contact with the reactant stream.

References Cited
UNITED STATES PATENTS

| | | | |
|---|---|---|---|
| 3,296,119 | 1/1967 | Bicek | 208—139 |
| 3,562,147 | 2/1971 | Pollitzer et al. | 208—139 |
| 3,647,680 | 3/1972 | Greenwood et al. | 208—65 |

DELBERT E. GANTZ, Primary Examiner

J. W. HELLWEGE, Assistant Examiner

U.S. Cl. X.R.

208—65, 140, 165; 252—418, 441; 23—288 G